(No Model.)

C. F. JENKINS.
PHANTOSCOPE.

No. 536,569.    Patented Mar. 26, 1895.

Witnesses
Oliver M. Maxam
Anna A. Elder

C. Francis Jenkins
Inventor

UNITED STATES PATENT OFFICE.

CHARLES FRANCIS JENKINS, OF RICHMOND, INDIANA.

PHANTOSCOPE.

SPECIFICATION forming part of Letters Patent No. 536,569, dated March 26, 1895.

Application filed November 24, 1894. Serial No. 529,856. (No model.)

*To all whom it may concern:*

Be it known that I, CHARLES FRANCIS JENKINS, of Richmond, Wayne county, State of Indiana, have invented a new and useful device for exhibiting a series of pictures of an object, by means of which an impression of real action and movement of the object is conveyed to the eye of the observer, of which the following is a specification.

The instrument depends for its effective operation upon the persistence of vision which permits each picture to be successively illuminated before the image of the preceding picture has faded from the retina of the eye.

In the accompanying drawings, forming a part of this specification, and in which, to avoid confusion, the frame construction is omitted, like symbols refer to like parts wherever they occur, in which—

Figure 1:
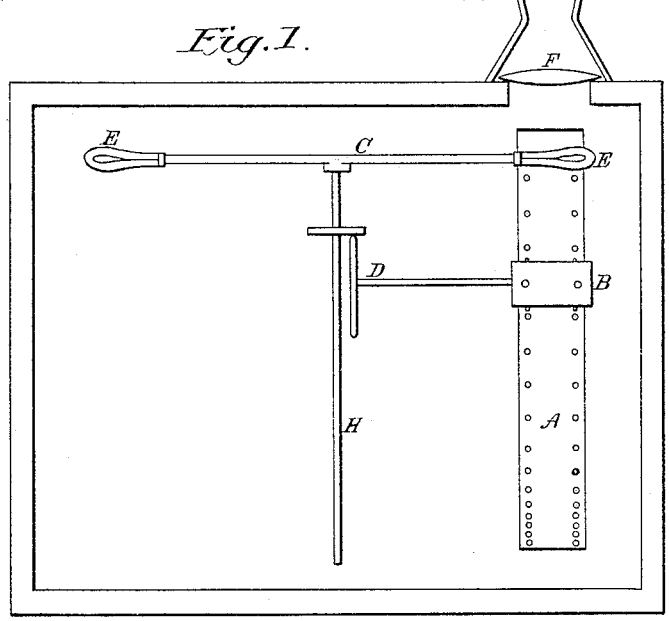
Figure 2:
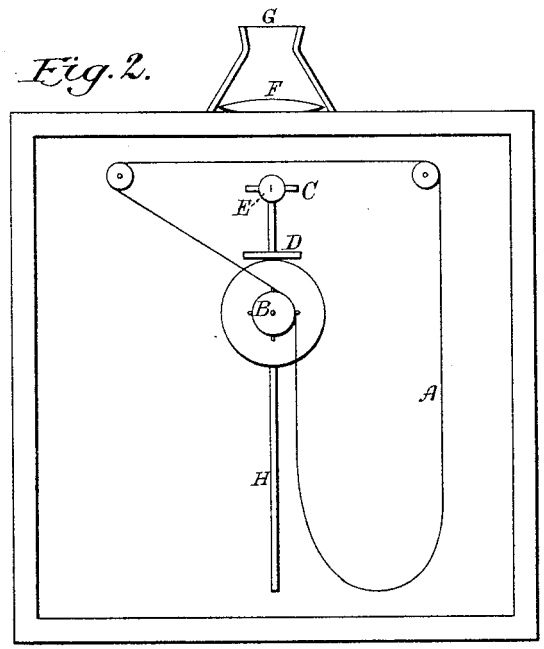

Figure 1 is a sectional elevation, and Fig. 2 an end elevation, in both of which A is a film, upon which is arranged a series of pictures; B, a drum for feeding said film; C, a bar mounted upon a shaft H and revolving in a plane perpendicular thereto. E, E are electric lamps mounted upon the ends of said bar; D, gearing for feeding the film uniformly; F, a lens for magnifying the pictures arranged upon the film; and G an opening through which the pictures upon the film A can be observed.

The proportion of the gearing between, and which causes synchronous movement of the revolving lights and the film-feed B, is such that the film is advanced the distance between two pictures at each half revolution of shaft H, which brings the pictures and the lights synchronously beneath the lens through which the pictures are projected. The rapid motion imparted to the pictures gives the observer the impression of real action referred to, which I now proceed to more fully describe.

It is a fact of common knowledge that in this class of apparatus it is necessary to illuminate the pictures for but a small fraction of the time required to pass one picture beneath the lens, and that this illumination shall recur only when each picture has come into such position. Various methods have been employed for doing this, in all of which the light has been positively cut off by a shutter, whereas in my device the beam of light is continuous, and is moved into and out of the axis of the lens. The movement of the light itself is in a plane which is at an angle, preferably ninety degrees, to the line of the axis of the lens. The tape "A," on which are a large number of pictures, is constantly passed beneath the lens "F" and the opening "G." No pictures can be observed beyond the opening, or even by looking through the opening into the interior of the casing, without the pictures are illuminated. If, however, light be now placed beneath the tape in the axis of the lens, picture-carrying light is projected; but as these pictures are seen in all the positions they assume in passing beneath the lens, the image seen by the eye is not sharply and clearly defined, for, owing to the persistence of vision, the eye retains for a short time impressions of all these positions and distorts the picture beyond all semblance of the real image. If, on the contrary, each picture is lighted but for a very brief interval, the pictures are not moved far enough, while such illumination lasts, to distort its impressed image. The means employed in the method therein described consists in illuminating these pictures by passing the continuous beam of light intermittently across the axis of the lens, so much more rapidly than the film or tape moves that the latter is apparently stationary.

Any suitable motor for driving the mechanism may be employed for that purpose.

Several modifications of this new principle, *i. e.*, synchronously traveling light and pictures, broadly, are possible without departing from the spirit of my discovery.

What I claim, therefore, as my invention, and wish to secure by Letters Patent, is—

The method herein described of illuminating pictures, in a picture exhibiting apparatus, which consists in synchronously moving into and out of the axis of the lens a picture and a continuous beam of light, substantially as set forth herein.

C. FRANCIS JENKINS.

Witnesses:
OLIVER M. MAXAM,
M. CUMMING.